(12) United States Patent
Miethlinger et al.

(10) Patent No.: US 11,724,430 B2
(45) Date of Patent: Aug. 15, 2023

(54) PLASTICATING SCREW

(71) Applicant: EREMA ENGINEERING RECYCLING MASCHINEN UND ANLAGEN GESELLSCHAFT M.B.H., Ansfelden (AT)

(72) Inventors: Juergen Miethlinger, Gampern (AT); Hans Juergen Luger, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 323 days.

(21) Appl. No.: 16/764,552

(22) PCT Filed: Oct. 23, 2018

(86) PCT No.: PCT/AT2018/050020
§ 371 (c)(1),
(2) Date: May 15, 2020

(87) PCT Pub. No.: WO2019/094996
PCT Pub. Date: May 23, 2019

(65) Prior Publication Data
US 2020/0391428 A1    Dec. 17, 2020

(30) Foreign Application Priority Data
Nov. 16, 2017    (AT) .............................. A 50961/2017

(51) Int. Cl.
*B29C 48/62*    (2019.01)
*B29C 48/65*    (2019.01)
(Continued)

(52) U.S. Cl.
CPC .............. *B29C 48/62* (2019.02); *B29C 45/60* (2013.01); *B29C 48/53* (2019.02); *B29C 48/65* (2019.02); *B29C 48/67* (2019.02)

(58) Field of Classification Search
CPC ........... B29C 48/53; B29C 48/62; B29B 7/42; B29B 7/429
See application file for complete search history.

(56) References Cited

U.S. PATENT DOCUMENTS 4,092,015 A * 5/1978 Koch ...................... B29C 48/65
425/208
4,840,492 A    6/1989 Nakamura
(Continued)

FOREIGN PATENT DOCUMENTS

CN    101 428 468 A    5/2009
DE    23 62 806 A1    6/1975
(Continued)

OTHER PUBLICATIONS

International Search Report in related International Application PCT/AT2018/050020 dated Jan. 23, 2019 (five pages).

*Primary Examiner* — Alison L Hindenlang
*Assistant Examiner* — Debjani Roy
(74) *Attorney, Agent, or Firm* — Kilpatrick Townsend & Stockton LLP

(57) ABSTRACT

A plasticating screw is proposed, with a screw channel, which runs spirally around a screw core, is laterally delimited by a flight (1), (2) and has flow elements (3), (4) that are distributed over its longitudinal direction, extend transversely over the screw channel and comprise a deep section (5) and a compression section (6), rising radially in the longitudinal direction. In order to design a plasticating screw of the type mentioned at the beginning in such a way that its length is reduced and good melting characteristics can be achieved even with little energy input, it is proposed that the compression section (6) forms at least one run-up surface (7), which is inclined towards the flight (1), (2) and is adjoined in the longitudinal direction by a plateau (8) for forming the flow.

5 Claims, 2 Drawing Sheets

Figure 2:
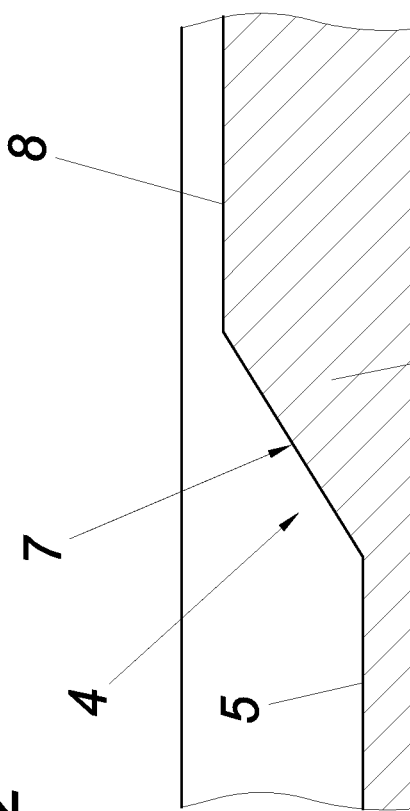

(51) Int. Cl.
*B29C 48/67* (2019.01)
*B29C 48/53* (2019.01)
*B29C 45/60* (2006.01)

(56) References Cited

U.S. PATENT DOCUMENTS 6,497,508 B1 * 12/2002 Womer .................. B29B 7/421
366/90
2011/0222363 A1 * 9/2011 Mazzocca ............... B29C 48/56
366/81

FOREIGN PATENT DOCUMENTS

| | | |
|---|---|---|
| FR | 2 224 283 A1 | 10/1974 |
| JP | S61-158417 U | 10/1986 |
| JP | S6115841 * | 10/1996 |
| JP | 2001-62897 A | 3/2001 |

* cited by examiner

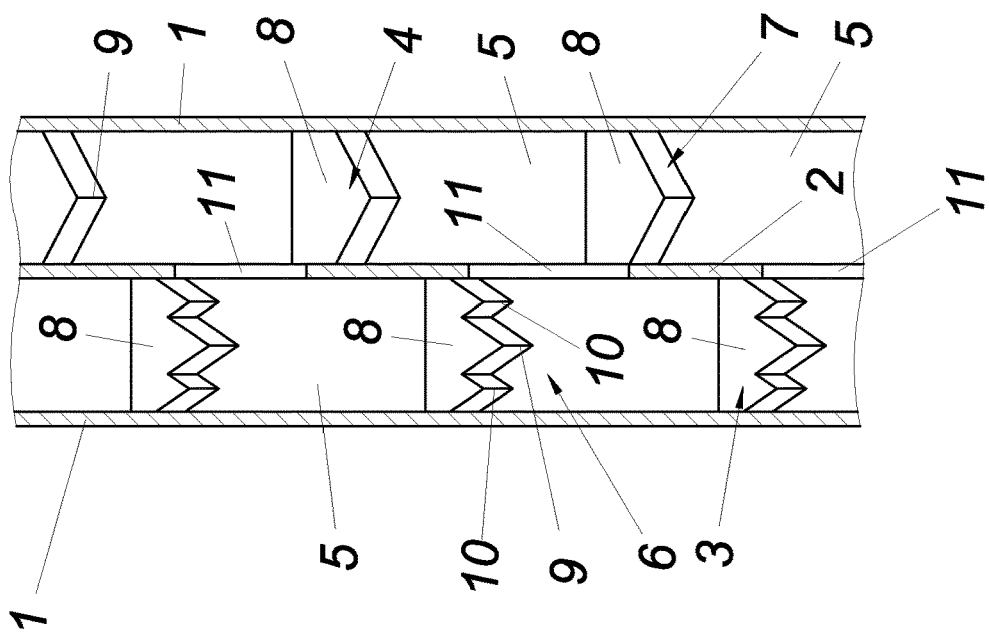
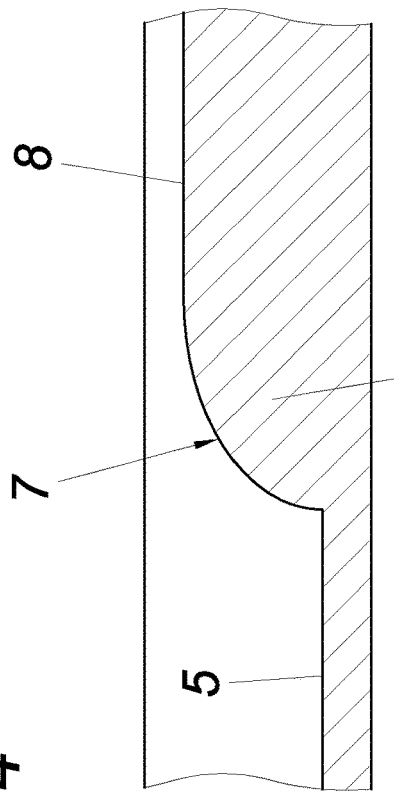
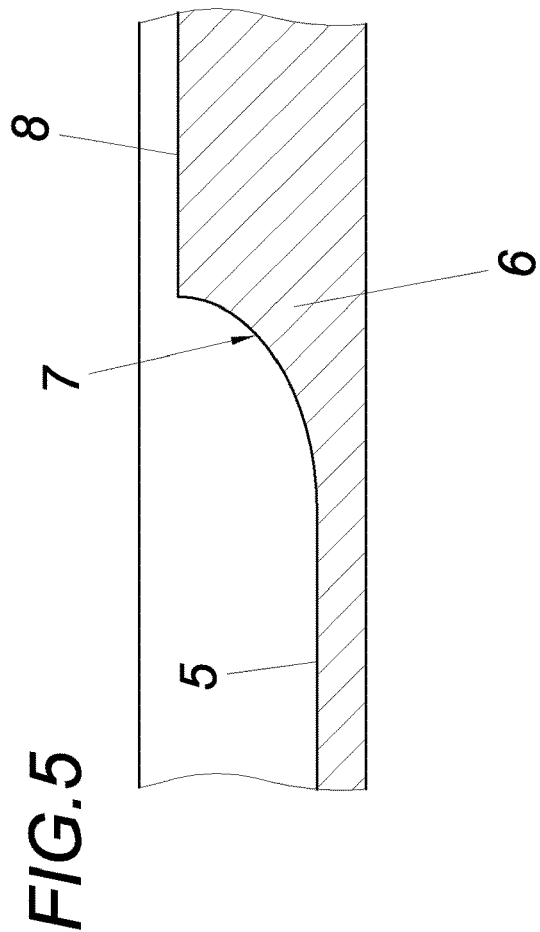

PLASTICATING SCREW

This application is a U.S. National Phase of International Application No. PCT/AT2018/050020, filed Oct. 23, 2018, which claims priority to Austrian Patent Application No. A50961/2017, filed Nov. 16, 2017, the disclosures of which are incorporated by reference herein.

TECHNICAL FIELD

The invention relates to a plasticating screw with a screw channel that runs spirally around a screw core and is laterally delimited by a flight, said screw channel comprising flow elements that are distributed over its longitudinal direction and extend transversely over the screw channel, said flow elements having a deep section and a compression section radially rising in the longitudinal direction, wherein the compression section forms at least one run-up surface inclined towards the flight, to which run-up surface a plateau for flow formation is connected in the longitudinal direction.

PRIOR ART

Plasticizing screws are known that form flow elements in their screw channels with a deep section and a compression section radially rising and sinking in the longitudinal direction, so-called wave elements (U.S. Pat. Nos. 6,176,606 B1, 5,375,992 B1). These wave elements have the task of splitting up the solid material bed and thereby bringing about a more efficient melting process through surface enlargement of the solid material shares. In the compression of wave elements, a solid material share that is too high leads to blockages of the flow cross-section. In this case, the conveying capacity is higher than the melting capacity. As a result, pressure fluctuations occur, causing fluctuations in the end product and leading to rejects. Consequently, such wave elements can only be used meaningfully below a certain and comparatively low solid material share, as is the case with comparatively low output. Thus, while the melting performance can be increased compared to conventional screw concepts, it is disadvantageous that a compacting of the bulk material to a solid material bed occurs from the solid material conveyance zone to the melting zone, wherein said bulk material can only be melted with disproportionately high energy input or a correspondingly long plasticating screw due to its small contact area with the melt.

From the prior art, plasticating screws are also known, whose compression sections form at least one run-up surface that is inclined towards the flight, to which a plateau for flow formation is connected in the longitudinal direction (DE 2542515 A1, DE 2256902 B1).

PRESENTATION OF THE INVENTION

The invention is therefore based upon the task of designing a plasticating screw of the aforementioned kind in such a way that its length can be reduced and, despite low energy input, a good melting behavior can be achieved.

The invention is based upon the knowledge that the formation of an extensional flow profile in the solid material melt mixture particularly favors a breakdown of agglomerates and leads to an improved melting behavior. Such an extensional flow can be induced in that, according to the invention, the compression section forms at least one run-up surface that is inclined towards the flight, to which a plateau for flow formation is connected in the longitudinal direction, whereby the melt meets the inclined run-up surface of the compression section over the breadth of the screw channel at various points in time. The inclination of the run-up surface to the flight is to be understood such that, in the case of a planar run-up surface, the normal vector of this surface cuts through the lateral planes that stretch through the flights. By contrast, in the case of conventional wave elements, the normal vectors of the run-up surfaces are aligned parallel to the two lateral planes. However, the extensional flow to be set according to the features according to the invention can only be fully formed if there is a flow stabilization after the compression section, which is achieved by the plateau according to the invention. Because the melt is also subject to a time-delayed compression over its breadth due to the features according to the invention, a secondary flow is formed in addition to the aforementioned extensional flow due to the different pressure levels along the breadth of the screw channel. With a synergistic overall effect, this leads to a better melting behavior, for which reason an additional energy input can be omitted. Because the flow elements according to the invention allow a more efficient splitting of the solid material bed and are therefore suitable for comparatively higher solid material shares and outputs with the same screw length, the plasticating unit can have smaller installation lengths with the same output and solid material share. There can thus be particularly advantageous conditions with respect to the melting process when combining several flow elements connected in series.

In order to be able to arrange the flow elements according to the invention closer to the solid material conveyance zone and thus to positively influence the melting behavior already at an early stage, it is proposed that the compression section of the flow elements forms at least two run-up surfaces inclined towards opposing flight sections, said run-up surfaces forming a wedge pointing against the flow direction. The resulting plough-shaped compression sections split and break up the solid material melt mixture, so that the solid particles are dispersed in a surrounding melt matrix. As a result, a substantially greater surface of the solid materials is available for the melting process, which further improves the melting behavior. To enhance the effect, multiple plough-shaped wedges can also be provided, which are spread over the breadth of the screw channel. In particular, it can be advantageous to provide a centrally arranged main wedge with one or more side wedges arranged symmetrically to the main wedge. In addition to splitting or breaking down the solid material bed, the wedge-shaped arrangement of the run-up surfaces produces the additional technical effect that an already existing rotational transverse flow is split up and reassembled in order to enhance the melt transport from the surface of the solid particles. By virtue of the wedge shape, which favors the flow, the flow behavior is not negatively influenced compared to known baffling elements. Overall, due to the features according to the invention, the flow elements can be used advantageously as dispersing and distributive mixing parts not only in the melting zone, but, in particular, also in the melt conveyance zone of the plasticating screw.

In order to make the splitting of compacted solid material beds even more efficient, the run-up surfaces of the compression sections can be concavely or convexly curved in the longitudinal direction of the screw channel. In the case of a concave curvature with respect to the longitudinal cross-section, the formation of an extensional flow can be favored in that a breakdown of the extension flow is avoided due to an initially less strong ascension of the run-up surface of the compression section. Conversely, in the case of a convex design of the longitudinal cross-section of the run-up surfaces, the flow element can have more intensive of an effect on the solid material bed by means of more abrupt flow deflections.

In order to further increase the shearing and stretching forces in addition to the described effects with the assistance of the flow elements according to the invention, the plateau for flow formation can be designed in a wave-like manner in the longitudinal direction of the screw channel. Moreover, wave elements can also be arranged on such a plateau so that the homogenization is further improved.

In order to increase the throughput due to a higher energy dissipation, the plasticating screw according to the invention can form at least two screw channels separated from one another by a common flight, wherein the flow elements are arranged in said screw channels and are offset and spaced apart from one another, respectively.

In order to ensure improved homogenization of the solid material melt mixture during the melting process in the multiple embodiments of the plasticating screw according to the invention, it is proposed that the common flight of the screw channels be broken through in an area that is upstream from the respective flow elements in the flow direction. Thereby, a more complex flow profile can be formed, which is thus more advantageous for the efficiency of the plasticating unit. Accordingly, there is a more efficient melting process and an improved homogenization of the solid material melt mixture and/or the melt.

BRIEF DESCRIPTION OF THE INVENTION

Figure 3:
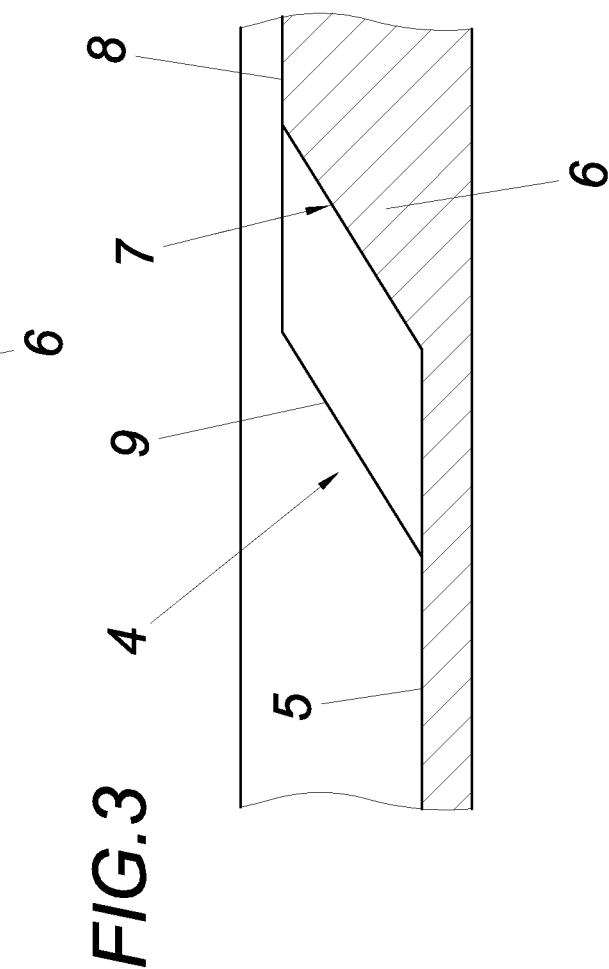
Figure 1:
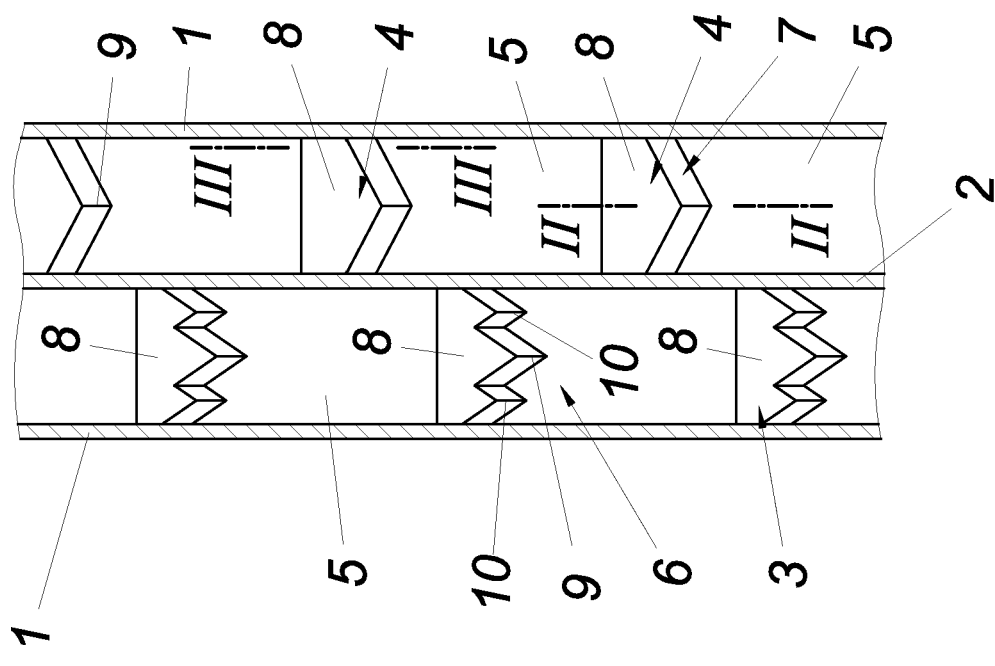

An example of the object of the invention is shown in the drawing. The following are shown:

FIG. 1 a schematic view of two screw channels of a plasticating screw according to the invention, FIG. 2 a cut along line II-II of FIG. 1 on a larger scale, FIG. 3 a cut along line of FIG. 1 on a larger scale, FIG. 4 a cut according to FIG. 2 of an alternative embodiment of the flow element according to the invention, having convex run-up surfaces, FIG. 5 a cut according to FIG. 2 of an alternative embodiment of the flow element according to the invention, having concave run-up surfaces, FIG. 6 a view according to FIG. 1 of two screw channels of a plasticating screw according to the invention in an alternative embodiment.

MANNERS OF EXECUTING THE INVENTION

A plasticating screw according to the invention has a screw channel running spirally around a screw core and laterally delimited by a flight 1, 2. Flow elements 3, 4 extending in a transverse direction over the screw channel are distributed over the longitudinal direction of the screw channel.

As can be seen in particular in FIGS. 2-5, these flow elements 3, 4 have a deep section 5 and a compression section 6 rising along the screw channel in a radial direction, which forms at least one run-up surface 7 inclined towards the flight 1, 2. Subsequent to the compression section 6, there is a plateau 8 parallel to the screw core surface, to which plateau a deep section 5 is connected for decompression. The expansion in the radial direction of the flow elements 3, 4 is smaller than the height of the screw channel.

A flow of a solid material melt mixture or a melt transported in the longitudinal direction of the screw channel is first conveyed over the deep section 5 of a flow element 3, 4 and subsequently meets the run-up surfaces 7 of the compression section 6. Then, the flow continues over the plateau 8 until it finally flows into a deep section 5 for decompression.

In order to split up and break up a solid material bed, the compression section 6 can comprise at least two run-up surfaces 7 inclined towards opposing flight sections 1, 2, respectively, which form a wedge 9 pointed against the flow direction of the solid material melt mixture and the melt. According to the invention, multiple such wedges 9, 10 can also be provided, which are spread evenly over the breadth of a screw channel and form a main wedge 9 having multiple side wedges 10. Such an embodiment is shown in the drawing, for example in the flow elements 3.

As already described above, the run-up surfaces 7 can be designed either convexly, as shown in FIG. 4, or concavely, as shown in FIG. 5, in order to positively influence the flow profiles, which are set according to the invention, as needed.

While not shown separately in the drawing, the plateau 8 can have a wave-like design or, in principle, comprise wave elements known from the prior art in order to increase the shearing and stretching forces occurring in the melt.

According to a further embodiment, the plasticating screw according to the invention can form at least two screw channels that are parallel to each other in the longitudinal direction, said screw channels being separated from one another by a common flight 2. This is illustrated in FIG. 1, in particular, where the flow elements 3 of the one screw channel are offset and spaced apart from the flow elements 4 of the other screw channel.

In an alternative embodiment shown in FIG. 6 with respect to the screw channels shown in FIG. 1, the common flight 2 of the screw channels can have breakthroughs 11 in an area that is upstream from the respective flow elements 3, 4 in the flow direction.

The invention claimed is:

1. A plasticating screw comprising:
    a screw channel that runs spirally around a screw core and is laterally delimited by a flight, said screw channel comprising flow elements that are distributed over its longitudinal direction and extend transversely over the screw channel, the flow elements extending across a breadth of the flight, each flow element comprising:
        a deep section extending in the longitudinal direction of the screw channel; and
        a compression section radially rising in the longitudinal direction such that a flow of material enters the deep section and further enters the compression section, the compression section comprising:
            a first run-up surface inclined towards the flight and a plateau for flow formation, the first run-up surface connected to the plateau such that the flow of material flows over the first run-up surface toward the plateau; and
            a second run-up surface inclined towards another flight opposite the flight such that the first run-up surface and the second run-up surface form a wedge,
        wherein the flow elements are provided at least in a melting zone of the plasticizing screw.

2. The plasticating screw according to claim 1, wherein the first run-up surface and the second run-up surface of the compression section are concavely or convexly curved in the longitudinal direction of the screw channel.

3. The plasticating screw according to claim 1, wherein the plateau for flow formation is designed in a wave-like manner in the longitudinal direction of the screw channel.

4. The plasticating screw according to claim 1, wherein the plasticating screw forms at least two screw channels that are separated from one another by a common flight, in which screw channel flow elements are arranged that are offset and spaced apart from one another.

5. The plasticating screw according to claim 4, wherein the common flight is broken through in an area that is upstream from the respective flow elements in the flow direction.

\* \* \* \* \*